July 11, 1933.  J. V. KINDL  1,917,982
GAS FIXTURE
Filed Oct. 10, 1931  3 Sheets-Sheet 1

INVENTOR
JOSEPH V. KINDL
BY
ATTORNEY

July 11, 1933.  J. V. KINDL  1,917,982
GAS FIXTURE
Filed Oct. 10, 1931   3 Sheets-Sheet 2
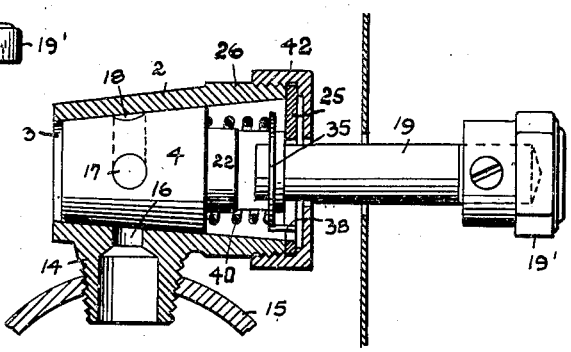
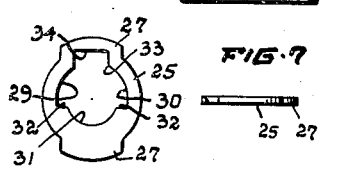
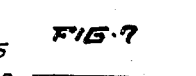
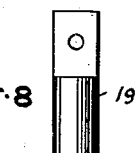
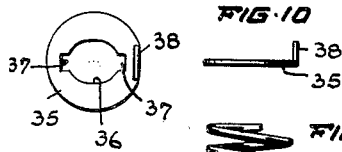
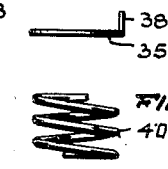
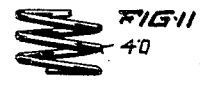
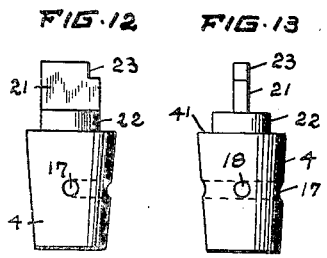
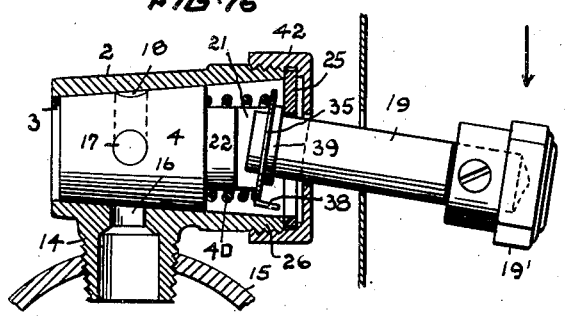
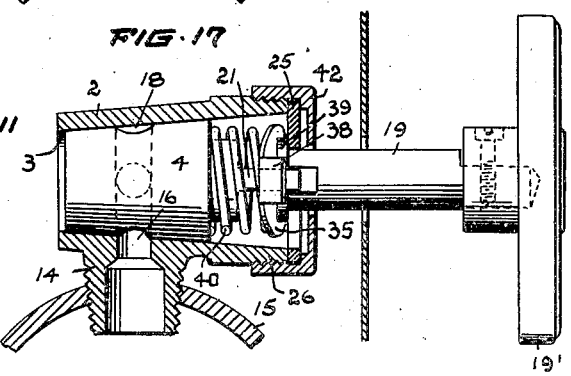
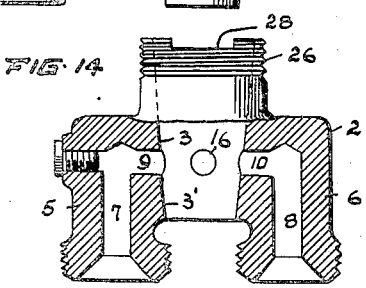
INVENTOR
JOSEPH V. KINDL
BY
ATTORNEY

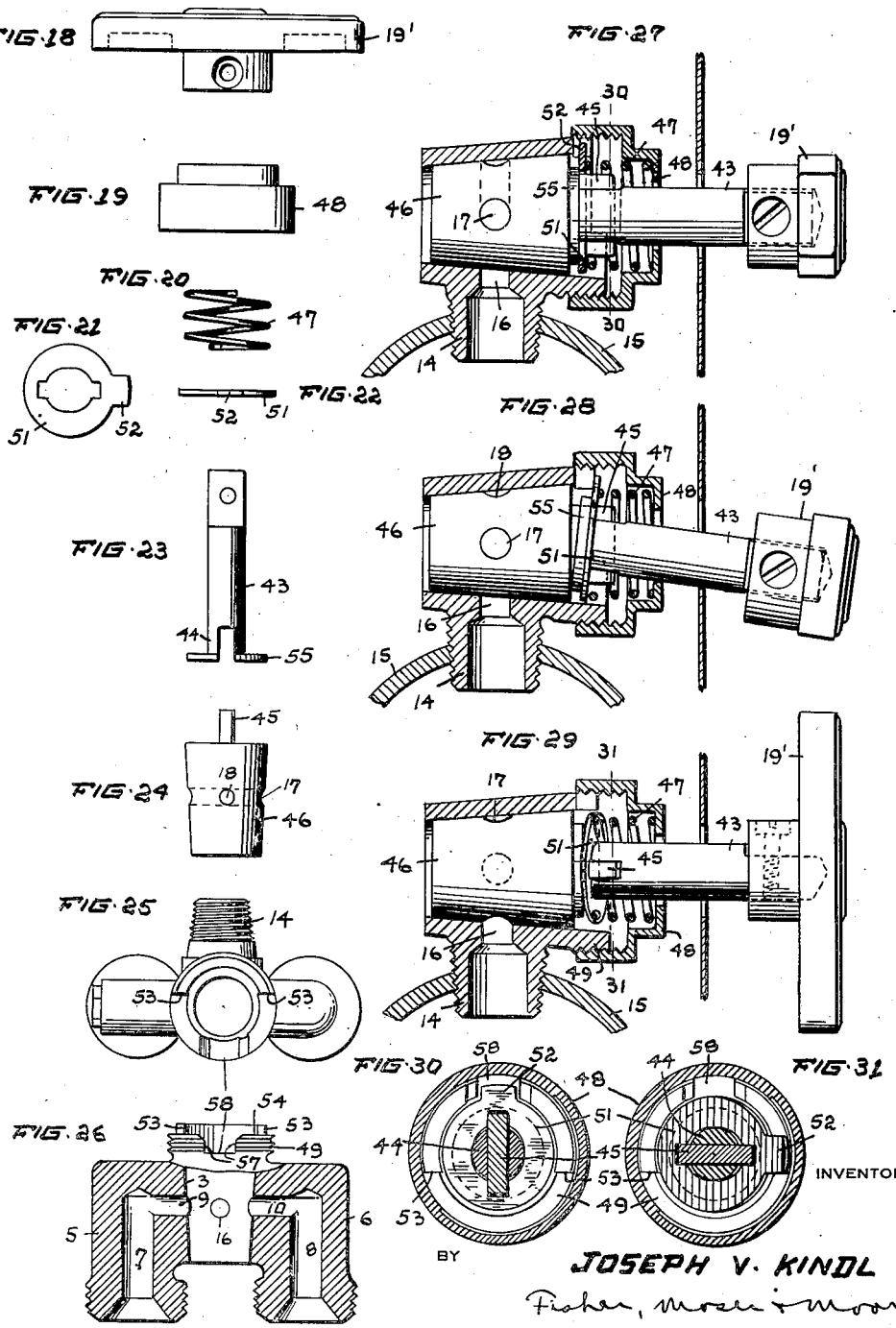

Patented July 11, 1933

1,917,982

UNITED STATES PATENT OFFICE

JOSEPH V. KINDL, OF CLEVELAND, OHIO, ASSIGNOR TO THE W. J. SCHOENBERGER COMPANY, OF CLEVELAND, OHIO, A CORPORATION OF OHIO

GAS FIXTURE

Application filed October 10, 1931. Serial No. 568,154.

This invention relates to improvements in gas fixtures and has reference to gas cocks or valves to prevent accidental opening of gas service lines, and more particularly to those related to gas stoves, ranges and the like, the general object being to provide a construction both simple and inexpensive which precludes accidental or careless opening of a gas supply control, such as a cock or valve. A principal feature of the invention is the provision of means normally acting to prevent turning movement of the valve, which can only be manipulated to open the service line when the operating stem and handle have been manually tilted, after which the gas supply passage may be made free and the service line opened by a turn of said stem and handle. A further feature resides in the construction of the valve proper, which comprises a tapered valve plug revolubly mounted in a valve body, and a stem tiltably and slidably interengaged with an extension of said valve plug and revoluble therewith in the valve body.

Further objects and advantages incident to the particular construction of the parts of the structure will be hereinafter apparent in the specification taken in connection with the accompanying drawings, in which two exemplified forms of the invention are illustrated.

Figure 1:
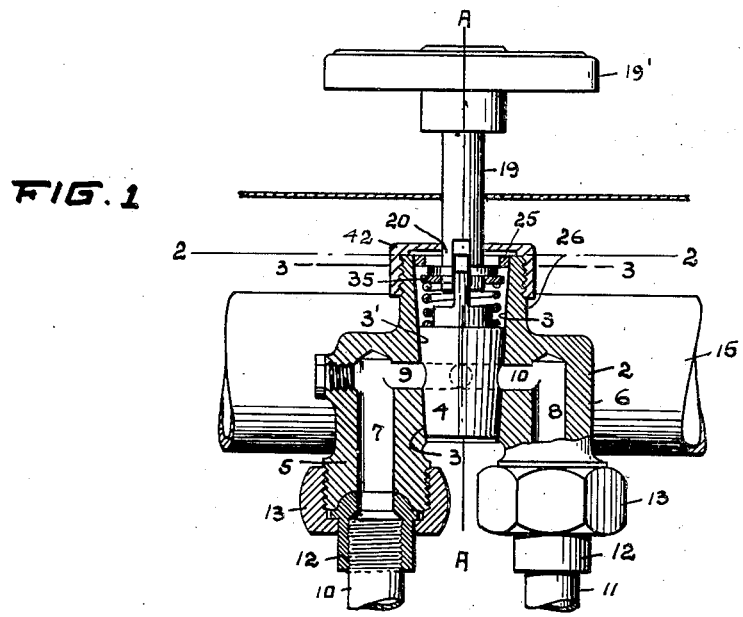
Figure 2:
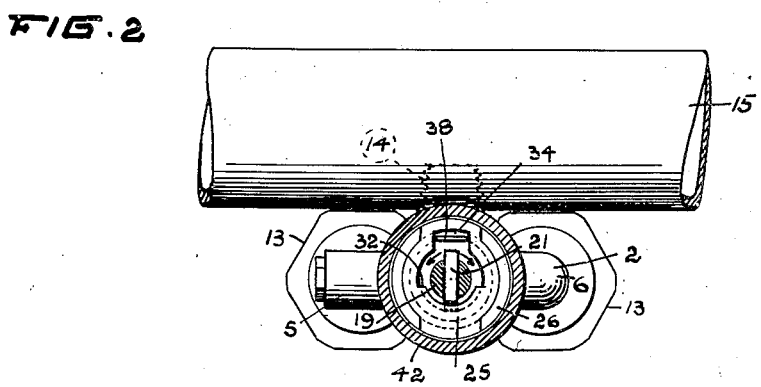
Figure 3:
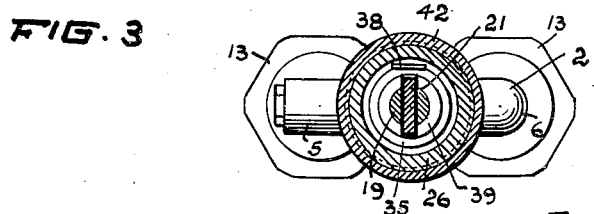

In these drawings Fig. 1 is a central section through a two-way valve embodying the invention attached to the manifold of a range or gas stove (not shown). Fig. 2 is a section on line 2—2 of Fig. 1 and Fig. 3 a section on line 3—3 of Fig. 1. Figs. 4 through 13 show the parts of the valve illustrated in Fig. 1. Thus, Fig. 4 is a side elevation of the handle, Fig. 5 a sectional view of the nut connecting handle and shaft with the valve body and Figs. 6 and 7 plan and side elevations of a washer interlocked with the top portion of the body of the valve. Fig. 8 is a side elevation of the operating stem and Figs. 9 and 10 plan and side elevations of the lock washer. Fig. 11 is a side elevation of the spring seating the valve and lock washer; Figs. 12 and 13 are side elevations of the rotatable valve and Fig. 14 a side elevation partly in section of the valve body. Figs. 15 through 17 are enlarged fragmentary sectional views through the valve taken on line A—A of Fig. 1. Thus, Fig. 15 shows the valve in locked neutral position, Fig. 16 a view similar to Fig. 15 with the operating stem and handle tilted and Fig. 17 also a view similar to Fig. 15 but with the valve in unlocked open position. Figs. 18 through 31 show a modified form of locking mechanism actuated by a tiltable valve stem. Thus, Fig. 18 is a side elevation of the handle and Fig. 19 a sectional view of the nut connecting handle and shaft with the valve body. Fig. 20 is a side elevation of the spring seating the valve and the lock washer. Figs. 21 and 22 are plan and side elevations respectively of the lock washer and Fig. 23 a side elevation of the operating stem. Fig. 24 is a side elevation of the rotatable valve and Figs. 25 and 26 are plan and side elevations, partly in section, of the valve body. Figs. 27 through 29 are fragmentary sectional views of the valve. Thus, Fig. 27 is a sectional view of the valve in neutral locked position, Fig. 28 a view similar to Fig. 27 with the operating stem tilted to unlock the valve, and Fig. 29 a view similar to Fig. 27 in open unlocked position. Fig. 30 is a sectional view on line 30—30 of Fig. 27 and Fig. 31 a sectional view on line 31—31 of Fig. 29.

Referring to the drawings, the U-shaped cast metal body 2 of the two-way valve disclosed in Figs. 1 through 17 has its central portion perforated or cored as at 3 for receiving the plug valve 4, which rotatably contacts the cone-shaped seat 3'. The branches 5 and 6 of body 2 communicate with opening 3' through passages 7, 8, 9, and 10, respectively, drilled in the body portion and branches thereof, and the outer ends of such branches are screw-threaded for connecting thereto, gas pipes 10 and 11, nipples 12 and nuts 13 being employed for rigidly holding the pipes in place. Body 2 includes a lateral branch or nipple 14 arranged in a plane substantially at right angles to the plane of branches 5—6, which nipple is threaded at its outer end for convenient attachment to the manifold 15 of a range or gas stove (not shown). Nipple 14 is hollow and communicates through passage 16 with opening 3, which in turn communicates with passages 7 and 8 through passages 9 and 10. A series of intersecting passages 17 and 18, in plug valve 4 may alternatively be brought into alignment with passages 9, 10 and 16, for the purpose of feeding gas to pipes 10 and 11. The valve just described is an ordinary two-way valve having two open positions, and a neutral closed position, in which the gas supply is entirely shut off.

In operation plug valve 4 is manually rotated by means of a slotted valve stem 19 interengaging at its slotted lower end 20, with a flat portion or extension 21 extending from the narrowed circular top 22 of the valve, which stem is provided with a handle 19' rigidly attached thereto at its upper end. Flat portion 21 is cut away at one side thereof, as at 23, and extends through a top plate 25 seated upon the screw-threaded neck 26 of body 2. Top plate 25 is provided with integral arms 27 which interlock with recesses 28 in said neck and prevent displacement of the plate, the latter being formed with an enlarged opening 29 to permit connection between stem 19 and extension 21 of valve 4. The wall of opening 29 which is of irregular configuration, includes axially aligned arcuate portions 30 and 31 of different radii, the former being larger than the latter, to provide stop shoulders 32 for limiting the rotation of valve 4. The radius of the arcuate portions 30 is equal to half the width of flat portion 21 and is also cut away at 33 to form a rectangular recess 34, centrally and oppositely disposed with respect to smaller arcuate portions 31, for a purpose hereinafter described. According to this arrangement of two interconnected arcuate portions the rotation of valve plug 4 is stopped when flat portion 21 engages shoulders 32.

Valve stem 19 loosely supports a spring-pressed locking washer 35 sleeved thereon, which is provided with a key-shaped opening 36, of proper size to slidably receive flat portion 21 of valve 4, and prevent spreading of the slotted lower end of stem 19. The opening 36 is of oblong shape, preferably oval and formed with two oppositely arranged rectangular cut out portions 37, axially aligned with the longer axis of its oval form. Washer 35 is also provided with a rectangularly offset finger portion 38, in axial alignment with said axis, adapted to engage recessed portion 34 in top plate 25 and thus limit the rotation of valve 4 to a half turn in either direction between stop shoulders 32. The lower slotted portion of stem 19 is provided with a round collar 39, which forms a seat for washer 35, and which also engages the plate 25, thus limiting upward movement of the stem. A heavy spring 40, seated upon a circular offset 41 on valve 4 opposite the base of its circular top 22 resiliently forces washer 35 and stem 19 into constant engagement with top plate 25. A hollow cap member 42, threaded upon neck 26 of body 2 is employed to secure plate 25 in place.

When valve plug 4 is seated to close supply passage 16 from communication with passages 7 and 8, washer 35 yieldingly engages in recess 34 of top plate 25, see Fig. 15. To release the finger portion 38 of this washer, stem 19 is tilted downwardly until said finger is entirely drawn out of recess 34, and after a slight turn of stem 19, finger 38 will seat and ride on the inner face of plate 25. In this position when washer 35 is tilted, see Figs. 16 and 17, the valve stem 19 and valve 4, may be freely rotated to make the desired connection between the main feed line and pipe lines 10 and 11 respectively. Turning of stem 19 and valve 4 in opposite directions to neutral position brings finger portion 38 of washer 35 into alignment with recess 34, so that spring 40 will force the finger portion into said recess and thus prevent further rotation of the valve. Consequently, it will be seen that it is impossible to rotate the valve beyond its neutral position unless the valve stem is tilted.

The tiltable locking mechanism illustrated in Figs. 1 through 17, hereinbefore described, may be simplified by directly interlocking the washer with the valve body and by utilizing said washer for limiting the rotation of the valve in opposite directions. Such a simplified structure is illustrated in Figs. 18 through 31, wherein I disclose the use of a slotted valve stem 43 interengaging at its slotted lower end 44 with a narrow upwardly extending portion 45 on a valve 46. A heavy compression spring 47 forces the stem 43 into engagement with extension 45, and a hollow cap member 48, threaded upon an extension 49 of body 50 holds the spring in place. Valve stem 43 carries a lock washer 51, provided with an oval shaped key opening of proper size to slidably and tiltably receive extension 45 of valve 46. This washer is formed with a straight finger portion 52, aligned with the longer axis of its oval shaped key opening, and adapted to engage shoulders 53 of recessed portions 54 of the extension 49, thereby limiting the rotation of valve 46 after a half turn in either direction has been made. Finger portion 52 also interlocks with slot 58 of extension 49 when moved to neutral position. A round disk 55 on the lower slotted end of the stem 43 provides a seat for washer 51 and also seats spring 47.

To release the finger portion 52 of washer 51, when interlocked with slot 58, stem 43 is tilted until said finger is drawn out of the slot, whereupon said finger after a slight turn of stem 43 seats upon and rides over the recessed outer edge 54 of the extension 49. In this position the valve and stem can be freely rotated to make any desired gas connection. The upper portions of side walls 57 of slot 58 are preferably chamfered to facilitate release of finger portion 52 by a relatively slight tilting of stem 43.

What I claim, is:

1. A valve, comprising a valve body having a valve seat, a valve rotatably confined within said seat, a shaft slidably tiltably and non-rotatably interlocked with said valve, means associated with said valve body to limit and stop the rotation of said valve and said shaft, and automatically actuated means axially shiftably mounted on said shaft and tiltable with respect thereto cooperating with said limiting and stopping means in locking said shaft and valve against rotation, when said valve is in neutral position, said locking means being disengageable by tilting said shaft.

2. A valve, comprising a valve body having a valve seat, a valve rotatably confined within said seat, a shaft tiltably and non-rotatably interlocked with said valve, and means associated with said valve body for stopping rotation of said valve, said means including a spring-pressed locking washer axially aligned with said shaft and slidably and tiltably interengaged with said valve for locking said shaft and valve when said valve is rotated to its neutral position, said locking washer being disengageable by tilting said shaft with respect to said rotatable valve and valve body.

3. A valve, comprising a valve body having a valve seat, a valve rotatably confined within said seat having a flat extension, a shaft having one end slotted and flanged, said shaft being sleeved with its slotted end over said extension, means associated with said valve body for stopping rotation of said shaft and valve, a locking washer having an oval shaped perforation tiltably and non-rotatably interengaged with said shaft and valve, said locking washer having a lateral finger portion axially aligned with the longer axis of said perforation and adapted to co-operate with said stopping means in locking said shaft and valve against rotation, and a heavy compression spring forcing said locking washer automatically into engagement with said stopping means when said valve and shaft are rotated to their neutral position.

4. A valve comprising a valve body having a valve seat and a hollow extension axially aligned with said seat, a valve rotatably confined within said seat having a flat-sided extension, a shaft having one end slotted and flanged, said shaft engaging said extension with its slotted end, a locking washer having an oval shaped perforation and a lateral angularly offset finger portion tiltably and non-rotatably interengaged with said shaft and valve, means co-operating with said locking washer to lock said valve and shaft against rotation, and a heavy compression spring shifting said locking washer automatically into engagement with said locking means, when said valve and shaft are rotated to their neutral position, said locking washer being disengageable from said locking means by tilting said shaft.

5. A valve comprising a valve body, a rotatable valve within said body, a shaft for operating said valve slidably tiltably and non-rotatably interlocked therewith, and means tiltable with respect to said valve and shaft, and associated therewith, for automatically locking said shaft and valve against rotation when said valve is in neutral position, said locking means being disengageable by tilting said shaft with respect to said valve and body.

6. A valve comprising a valve body having a valve seat and a hollow extension aligned with said seat, a slot in the wall of said extension, a recess in the circular edge of said extension, enclosing said slot, a spring-pressed valve rotatably confined within said seat having a flat-sided extension, a spring-pressed washer having an oval-shaped perforation tiltably coupled with said valve, said washer having a finger portion for engagement with said recess and slot of said extension, and an operating stem tiltably and non-rotatably coupled with said washer and the extension of said valve.

7. A valve comprising a valve body having a valve seat and a hollow screw-threaded extension, a chamfered slot in the wall of said extension, a valve rotatably confined within said seat having a flat-sided extension, a shaft having one end slotted and flanged and engaging said extension with its slotted end, a locking washer tiltably and non-rotatably interengaged with said shaft and the extension of said valve, said washer having a lateral finger portion for engagement with said slot, a perforated cap member for said hollow extension, and a heavy compression spring between said cap member and said locking washer for automatically shifting said washer and its finger portion into engagement with said slot when said valve is rotated to its neutral position, said locking washer being disengageable from said chamfered slot by tilting said shaft.

8. A valve comprising a valve body having a valve seat and a hollow externally screw-threaded extension aligned with said seat, oppositely arranged slots in the top edge of said extension, a cover plate having a notched perforation interlocked with the slots of said extension, a valve rotatably confined within said seat of said body and having a flat sided extension co-operating with said cover plate to limit the rotative movement of said valve, a locking washer having an oval-shaped perforation tiltably coupled with said valve, and an angularly offset finger portion axially aligned with the longer axis of said perforation of the washer adapted to co-operate with the notch of the perforation of said cover plate, an operating stem tiltably and non-rotatably coupled with said washer and the extension of said valve, a heavy compression spring between said valve and said washer to automatically lock said valve and stem in neutral position against rotation, and a cap member for the screw-threaded extension of said body, said washer being disengageable from said notch by tilting said stem.

In testimony whereof I affix my signature.

JOSEPH V. KINDL.